(No Model.)

R. H. HOSKINS.
Thrashing Machine.

No. 238,197. Patented Feb. 22, 1881.

Witnesses:
W. B. Masson.
W. E. Bowen.

Inventor:
Robert H. Hoskins
by Doubleday and Bliss
atty

UNITED STATES PATENT OFFICE.

ROBERT H. HOSKINS, OF LOUISVILLE, KENTUCKY, ASSIGNOR TO SEYMOUR, SABIN & CO., OF STILLWATER, MINNESOTA.

THRASHING-MACHINE.

SPECIFICATION forming part of Letters Patent No. 238,197, dated February 22, 1881.

Application filed August 2, 1880. (No model.)

*To all whom it may concern:*

Be it known that I, ROBERT H. HOSKINS, of Louisville, in the county of Jefferson and State of Kentucky, have invented certain new and useful Improvements in Thrashing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
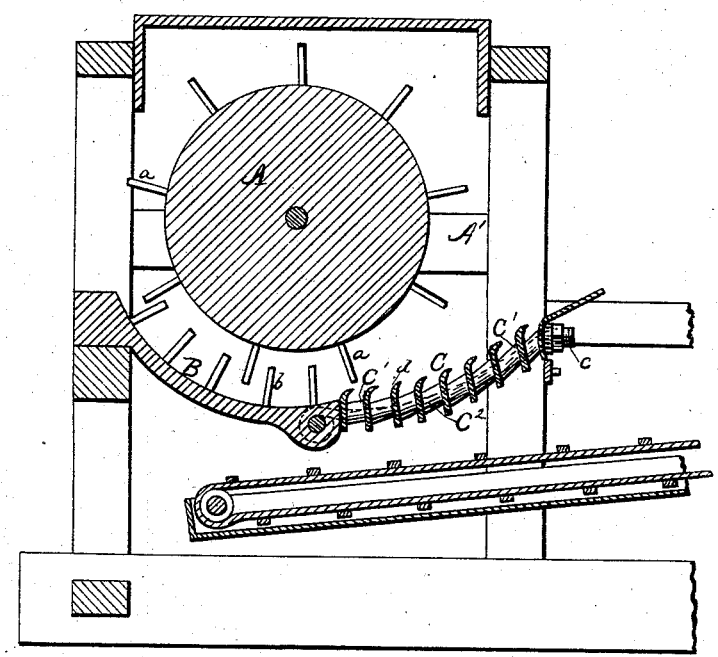
Figure 2:
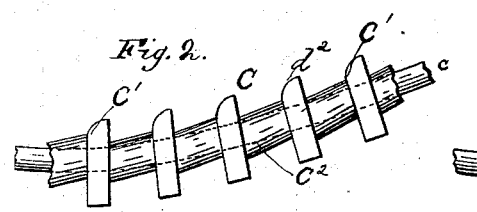
Figure 3:
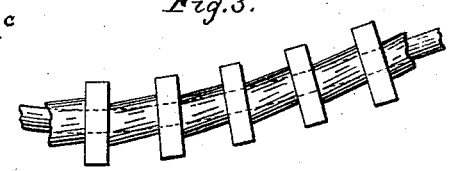

Figure 1 is a vertical section of a part of a thrashing-machine embodying my invention. Fig. 2 is a view of a modified form of the grate-bars. Fig. 3 illustrates the grate-bar heretofore ordinarily employed.

In the drawings, A represents the thrashing-cylinder, mounted on the frame-work A' A', which parts may be of any preferred character, they forming no essential part of this invention.

B is a tight concave beneath the front part of the thrashing-cylinder A, it being provided with teeth $b$, corresponding to the teeth $a$ on the cylinder.

C represents a grate, preferably concave in form, and situated behind the tight concave beneath the rear part of the cylinder. This grate is formed of bars C' C', arranged parallel to each other across the machine, and supported upon rods $c$, there being spacing-thimbles $C^2$ on the rods $c$ between the bars C'.

After the material has been thrashed by the cylinder and the concave B it passes toward the vibrator, (not shown,) and as it moves over the grate the loose grain drops from the straw downward through the grate C to suitable rakes or conveyers. The grain, by reason of the momentum received from the cylinder, dashes against the bars of the grate with great force, as will be readily seen, and as is well known to those acquainted with the operation of these machines.

Heretofore it has been customary to construct the grate which is beneath the cylinder of bars having sharp corners or edges turned toward the cylinder, as shown in Fig. 3. When grate-bars of this character are used it is found that much grain is bruised or broken by its striking against the sharp edges or corners above described, especially when grain of the softer species is being thrashed.

The object of my invention is to so construct the bars of the grate that they shall present no sharp edges to the grain as it is hurled from the cylinder, but shall receive it upon smooth surfaces, and thus avoid the danger of cutting, bruising, or breaking it.

By examining the bars of the grate shown in Fig. 1 it will be seen that they are bent backward away from the cylinder on lines above the supporting-rods $c$ in such manner as to provide smooth rounded faces $d\ d$, lying toward the cylinder. By means of this construction no cutting-edges lie in the path of the grain as it leaves the cylinder, and the bruising or breaking of it is avoided.

Instead of forming the bars C' of thin pieces of metal and bending them, as shown in Fig. 1, they may be made of thicker pieces of metal, having the upper corners which are toward the cylinder rounded or beveled, as shown at $d^2$, Fig. 2.

I am aware that grates have been heretofore constructed with bars so inclined as to present one of the sides of each bar toward the cylinder. When the bars are thus inclined, there is still a sharp edge left to mar the berries of grain, and, moreover, the tendency to throw the grain out with the straw is much greater than when they are arranged radially, or as nearly radially as possible, relatively to the cylinder, the grain rebounding upward and outward from the outwardly-inclined faces. I do not alter the radial, or nearly radial, position of the bars, and thus I preserve a free downward passage-way for the grain, and present no outwardly-inclined surfaces to induce the bounding of the berries outward with the straw. The rounding of the exposed corners increases the surface that operates to turn the grain downward and back, without, however, necessitating any change in the position of the bars. The downward passage-way is thus made freer than when the bars are inclined outwardly. The rounding of the exposed corner thus not only prevents the liability of marring the grain, but also avoids the necessity of presenting a wide outwardly-deflecting surface in the path of the grain, this latter being the disadvantage experienced when the grate-bars are inclined outward.

Bars similar to those shown in Fig. 1 may be made very cheaply and of thinner metal than that ordinarily employed, as the bending back increases the strength of the bars.

What I claim is—

The combination, with the thrashing-cylinder A and concave B, of the grate formed of bars C' C', inclined toward the cylinder, and having their upper ends arranged in an inclined plane and beveled or curved, substantially as set forth.

In testimony that I claim the foregoing I have hereunto set my hand this 8th day of July, 1880.

ROBT. H. HOSKINS.

Witnesses:
D. A. KEAN,
G. W. CHATFIELD.